(12) United States Patent
Tooyama et al.

(10) Patent No.: US 6,719,144 B2
(45) Date of Patent: Apr. 13, 2004

(54) METHOD OF SEPARATING OXIDE FROM DROSS, DEVICE FOR SEPARATING OXIDE FROM DROSS, AND JET SOLDER TANK

(75) Inventors: Toshio Tooyama, Tokyo (JP); Kenichi Tomitsuka, Kanagawa (JP); Shohei Mawatari, Saitama (JP); Tomotake Kagaya, Saitama (JP); Eihiko Muramatsu, Tokyo (JP)

(73) Assignees: Sony Corporation, Tokyo (JP); Senju Metal Industry Co., Ltd., Tokyo (JP)

( * ) Notice: Subject to any disclaimer, the term of this patent is extended or adjusted under 35 U.S.C. 154(b) by 0 days.

(21) Appl. No.: 09/788,154

(22) Filed: Feb. 16, 2001

(65) Prior Publication Data

US 2002/0005376 A1 Jan. 17, 2002

(30) Foreign Application Priority Data

Feb. 18, 2000 (JP) ........................................ 2000-041338

(51) Int. Cl.$^7$ ................................................. B03D 1/00
(52) U.S. Cl. ...................... 209/172.5; 209/172; 209/2; 209/4; 209/7; 209/10
(58) Field of Search .............................. 209/2, 4, 7, 10, 209/11, 172, 172.5

(56) References Cited

U.S. PATENT DOCUMENTS

| | | | | | |
|---|---|---|---|---|---|
| 4,981,876 | A | * | 1/1991 | Grimmer | 209/173 X |
| 6,080,497 | A | * | 6/2000 | Carey, II et al. | 428/647 |
| 6,202,855 | B1 | * | 3/2001 | Omtveit et al. | 209/172 |

* cited by examiner

*Primary Examiner*—Donald P. Walsh
*Assistant Examiner*—Kaitlin Joerger
(74) *Attorney, Agent, or Firm*—Frommer Lawrence & Haug LLP; William S. Frommer; Leonard J. Santisi

(57) ABSTRACT

When a printed board is soldered by a dipping method, a great deal of dross is generated on a jet solder tank. The dross is a mixture of melted solder and oxide. A worker takes out the dross from the jet solder tank, and throws it away. Thus, a large amount of the solder is consumed. The present invention relates to a separating device for separating oxide and solder from dross. A container (21) is provided with a heater (22). A cover (24) is set over the container (21) to be freely attachable or detachable, and further a non-oxidizing gas supplying opening (28) is made in the cover (24) or the container (21). A stirring spatula (25) for stirring the surface of a melted solder (23) put into the container (21) is set near the surface of the melted solder (23).

8 Claims, 6 Drawing Sheets

METHOD OF SEPARATING OXIDE FROM DROSS, DEVICE FOR SEPARATING OXIDE FROM DROSS, AND JET SOLDER TANK

BACKGROUND OF THE INVENTION

1. Field of the Invention

The present invention relates to a method for separating solder and oxide from dross of solder, a device for separating oxide, and a jet solder tank for soldering a printed board.

2. Description of the Related Art

As methods of soldering a printed board, there are known troweling, reflow, dipping and the like methods.

The troweling method is a method wherein a worker carries out soldering with a solder trowel and a solder wire in which a resin is put to each soldering portion. Thus, the troweling method is unsuitable for mass production. The main use of the troweling method is "post-soldering", wherein bad soldering generated by a different soldering method is modified, or wherein soldering is performed by a different method and subsequently an electronic component having a small heat-resistance is further soldered.

The reflow method is a method for applying a solder paste comprising powdery solder and pasty flux to a soldering portion of a printed board by printing or jetting, and then melting this solder paste in a heating device such as a reflow furnace, an infrared ray radiating device or a laser radiating device to carry out soldering. The reflow method is suitable for soldering a product having a small soldering portion, such as a surface mounted component, or a product having a narrow interval between leads. However, costs for producing the solder paste are high since the following labor is required: the solder is made into fine particles and the particles and the flux are uniformly kneaded.

The dipping method is a method for jetting a melted solder from a jet solder tank and then bringing the jetted solder into contact with a printed board to solder the board. This dipping method has far higher productivity than the troweling method and the reflow method since many soldering portions can be soldered at a time. Moreover, a solder for use is a rod-like solder, which is simple in processing; therefore, costs for producing it are low. Accordingly, the dipping method is suitable for soldering electric appliances that are inexpensive and are mass-produced, such as televisions or videos, and is most widely adopted at present.

Soldering of a printed board by the dipping method is performed in an automatic soldering machine. The automatic soldering machine is a machine having processing devices such as a fluxer, a preheater, a jet solder tank and a cooler. Moreover, in this machine, a pair of chains having many claws run from the fluxer to the cooler and above these devices. According to the automatic soldering machine, a printed board is soldered by holding the printed board with the claws between the pair of the running chains, applying flux thereto with the fluxer, preheating the board with the preheater, attaching solder thereto with the jet solder tank, and cooling the board with the cooler. The conventional jet solder tank used in this automatic soldering machine will be described referring to FIG. 1 (a plan view) and FIG. 2 (a cross section taken along B—B line of FIG. 1).

A non-illustrated heater is arranged inside or outside a box-shaped body 1 of the jet solder tank. This heater causes a solder 2 put into the body 1 to be melted and causes the solder to be kept at a constant temperature. A primary jet nozzle 3 and a secondary jet nozzle 4 are set up inside the body 1. The primary jet nozzle 3 has a narrow jet opening, and means for making the jetted melted solder harsh is disposed inside the nozzle. The secondary jet nozzle 4 has a wide jet opening, and the melted solder jetted from this nozzle 4 becomes a mild flow. A rectifying plate 6 in which many holes 5 are bored is set up inside each of the nozzles. The rectifying plate 6 is a member for rectifying the melted solder, in a turbulent flow state, which is sent with a pump that will be described later, and making the melted solder toward the nozzle stable.

A duct 7 is connected to each of the nozzles 3 and 4. A jet pump 8 is fitted to the end of the duct 7. An inhalation opening 9 is made in the lower side of the duct 7 to which the jet pump 8 is fitted. A hole 11, through which an axis 10 of the jet pump 8 is inserted, is made in the upper side of the duct 7.

A non-illustrated pulley is fixed onto the upper end of the axis 10 of the jet pump 8. This pulley is connected, through a belt, to a pulley of a non-illustrated motor set up outside the body 1.

Incidentally, when a printed board is soldered in the automatic soldering machine, a great deal of dross is generated in the surface of the melted solder in the jet solder tank. When the dross is generated in great volume in the jet solder tank, the jet state of the melted solder jetted from the nozzle becomes unstable. As a result, the height of the jetted solder becomes large or small. Moreover, no jetting of the solder may be caused. This is because dross 12 floating in the surface of the jet solder tank is sucked in by the jet pump 8 as shown in FIG. 2 and the dross adheres to the holes 5 in the rectifying plate 6 set up in the nozzles 3 and 4 to block the holes 5. If the holes 5 in the rectifying plate 6 are blocked in this way, the amount of the melted solder passing through the rectifying plate 6 is reduced. Thus, the height of the jetted solder from the nozzle becomes low. Thereafter, the dross 12 blocking the holes 5 in the rectifying plate 6 is separated together with the flow of the melted solder. As a result, the amount of the melted solder passing through the rectifying plate 6 becomes large suddenly so that the height of the jetted solder becomes high. In other words, the height of the jetted solder moves up and down and becomes0 unstable whenever the dross 12 blocks the holes 5 in the rectifying plate 6 or flows out from the holes 5.

If the height of the jetted solder is not stable in the jet solder tank, the melted solder does not adhere to a printed board passing above the jet solder tank so that the printed board is not soldered. Alternatively, the height of the jetted solder becomes high suddenly so that the melted solder pours over the upper surface of the printed board. Thus, such inconveniences that the solder adheres to portions that do not require the solder arise.

The dross 12 adheres to the printed board, so that problems such as a short circuit and poor appearance arise. The cause that the dross 12 adheres to the printed board when the printed board is soldered is that in the case that the dross 12 flowing out from the holes 5 in the rectifying plate 6 together with the melted solder are jetted from the nozzle as described above, the dross 12 adheres to the printed board when the printed board passes over the nozzle.

When the amount of the generated dross 12 becomes large, such an economic problem that the consumption of the solder increases arises. This is because when the dross 12 increases, the jetted solder state is unstable as described above or the dross 12 adheres to the printed board so that a worker always takes out and throws away the dross 12 from the jet solder tank. As a result, the solder changed into the dross 12 is consumed in a large amount.

An object of the present invention is to provide a method for separating oxide and a solder from dross generated in a jet solder tank (hereinafter referred to as a separating method), a device for separating oxide from dross (hereinafter referred to as a separating device), and a jet solder tank making it possible to separate oxide from dross.

SUMMARY OF THE INVENTION

The method for separating oxide from dross according to the present invention is a method, wherein the dross floating on a melted solder in a non-oxidizing atmosphere at 100° C. or higher is stirred together with the melted solder, thereby separating the solder and the oxide.

When the dross and the melted solder are stirred in the non-oxidizing atmosphere in this manner according to the present invention, the oxide included in the dross is separated by the stirring and the solder in the dross together with the dross dissolves into the stirred melted solder. If oxygen is present around the dross at this time, oxygen is again taken in the stirred melted solder so that the solder becomes dross. Thus, the amount of oxide and the dross increases. In the present invention, however, the dross is stirred in the state that no oxygen is present. Therefore, the melted solder does not take in oxygen.

In the separating method of the present invention, the non-oxidizing atmosphere must be 100° C. or higher. If the non-oxidizing atmosphere is below 100° C., the surface temperature of the dross drops so that the dross is not sufficiently separated from the oxide. In order to set the temperature of the non-oxidizing atmosphere at 100° C. or higher, the non-oxidizing atmosphere may be heated with a gas heating heater or a heater is set inside the non-oxidizing atmosphere. Alternatively, it is allowable that air-tightness of a cover for forming the non-oxidizing atmosphere is made sufficient and the temperature of the non-oxidizing atmosphere is set at 100° C. or higher by heat of the meted solder.

Examples of the non-oxidizing atmosphere used in the invention include inert gases such as nitrogen gas, carbon dioxide gas or argon gas; and active gases such as hydrogen gas and ammonia decomposed gas.

The device for separating oxide from dross of the present invention is a device wherein a container is provided with a heater, a cover is set over the container to be freely attachable or detachable, a non-oxidizing gas supplying opening is made in the cover or the container, and a stirring spatula for stirring the surface of a melted solder put into the container is set near the surface of the melted solder.

The separating device of the invention is a device wherein a melted solder is beforehand put into its body, dross is poured on the melted solder and then the resultant mixture is stirred to separate oxide and the solder. This separating device is located near a conventional automatic soldering machine, and dross generated in a jet solder tank is taken out from the jet solder tank and poured into the separating device. In other words, in the case that the separating device is located near the automatic soldering machine, oxide can easily be separated from the dross only by poring the dross into the separating device.

The jet solder tank of the present invention comprises a heater for heating a solder and a nozzle for jetting the solder melted by heating, wherein dross reservoir is covered with a cover, a non-oxidizing gas supplying opening is made in the cover, and a stirring spatula for stirring the surface of the melted solder is set up inside the cover.

The jet soldering tank of the present invention has therein a mechanism for separating oxide from the dross. Therefore, during soldering work, the oxide can be separated from the dross at any time.

DETAILED DESCRIPTION OF THE PREFERRED EMBODIMENTS

The inventors repeatedly made eager investigations into dross generated in a jet solder tank. As a result, it has been found that dross is a mixture of melted solder and oxide, and floats on melted solder in such a state as sand containing water. Thus, the inventors have paid attention to the fact that if oxide can be separated from dross, solder that can be still used can be used without throwing away the solder together with the dross.

Figure 3:
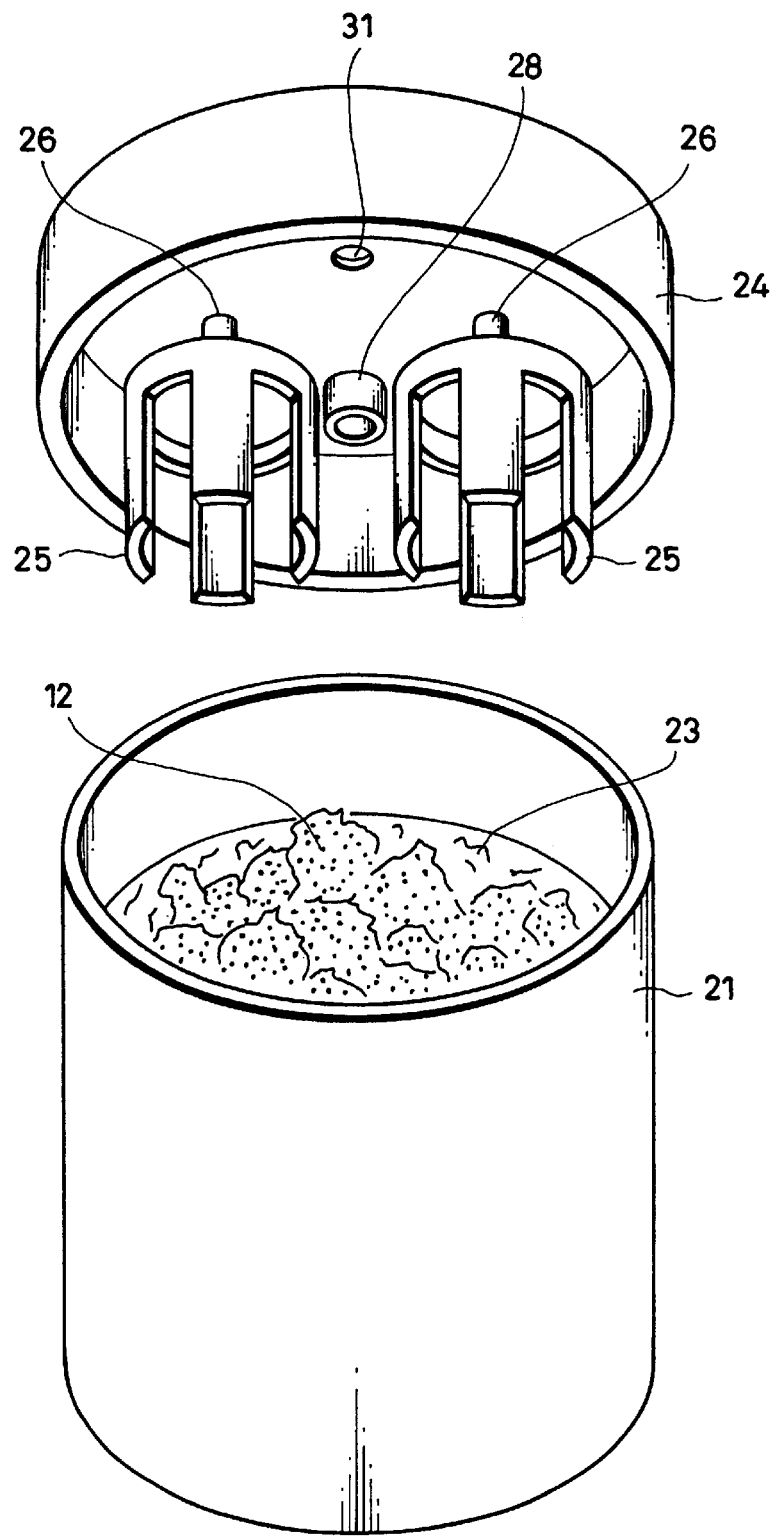
FIG. 3 is a perspective view showing a separating device of an embodiment according to the present invention, wherein its cover is opened.
Figure 4:
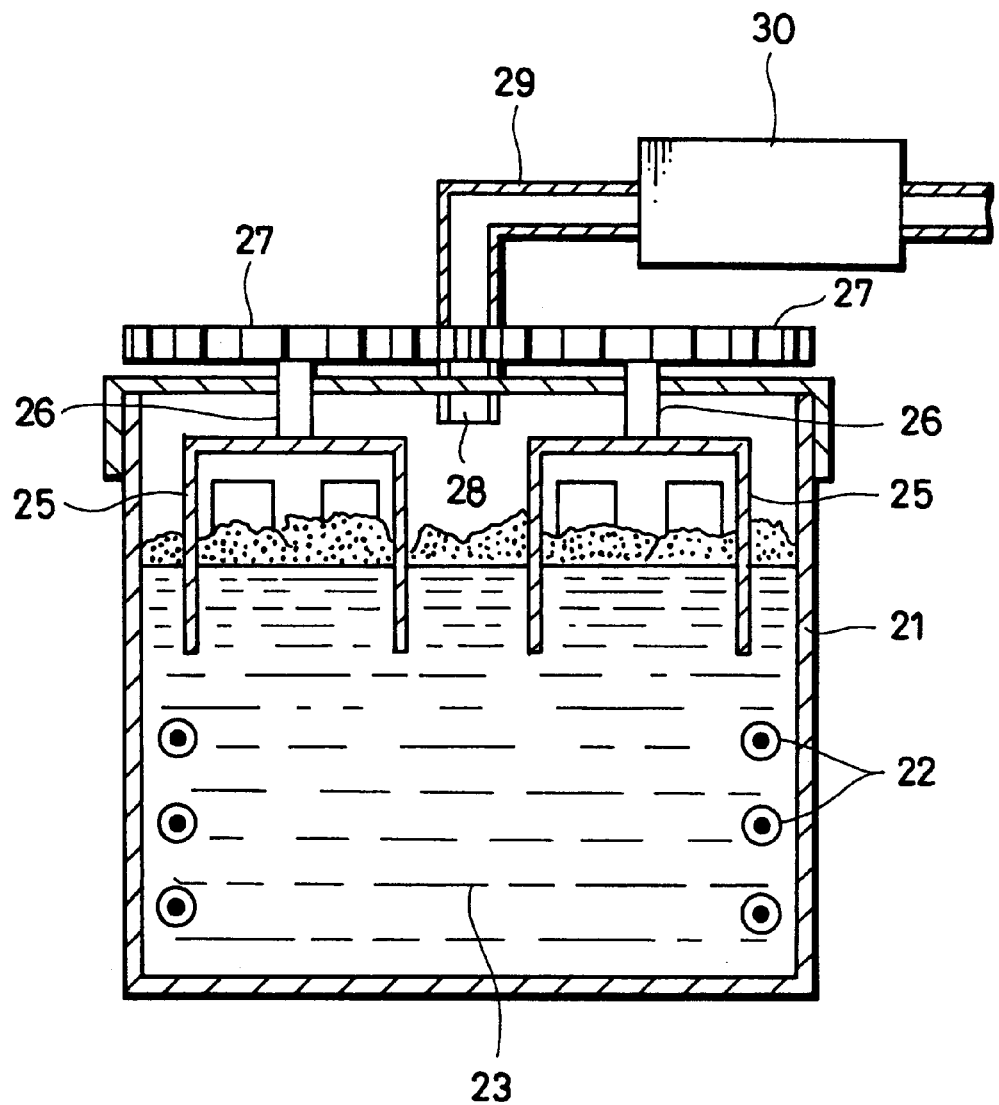
FIG. 4 is a front sectional view of FIG. 3.
Figure 5:
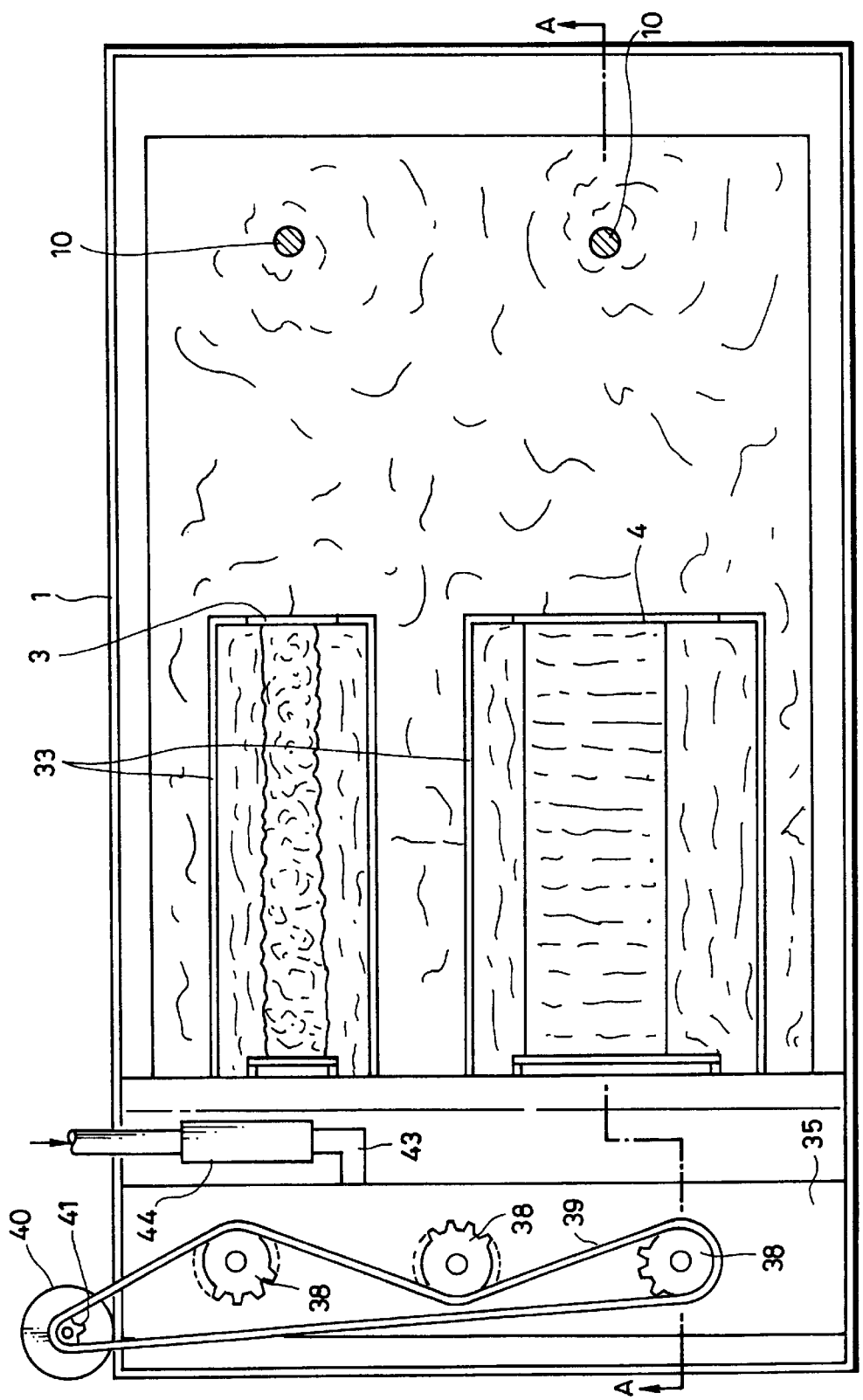
FIG. 5 is a plan view showing a jet solder tank of an embodiment according to the present invention.
Figure 6:
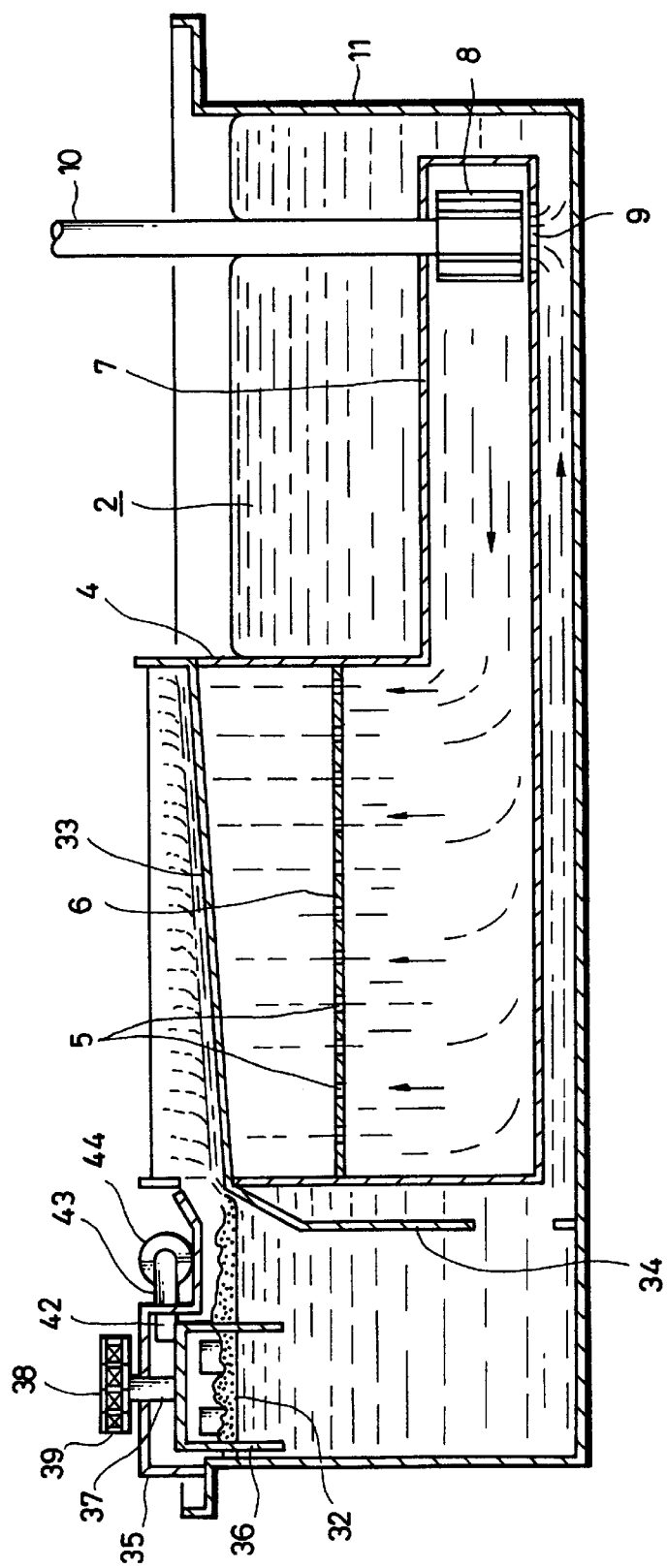
FIG. 6 is a sectional view taken along A—A line of FIG. 5.

Referring to the drawings, the following will describe an embodiment of a method for separating oxide from dross, a device for separating oxide from dross, and a jet solder tank according to the present invention. FIG. 3 is a perspective view showing the separating device of the present embodiment wherein its cover is opened. FIG. 4 is a front sectional view of the separating device. FIG. 5 is a plan view showing the jet solder tank of the present embodiment. FIG. 6 is a sectional view taken along A—A line of FIG. 5.

First, the separating device of the present embodiment will be described, referring to FIGS. 3 and 4. As shown in FIGS. 3 and 4, an electric heater 22 is spirally arranged inside a cylindrical body 21 having a bottom. A solder 23 is filled into the body 21. This solder 23 is melted and kept at a given temperature by the electric heater 22.

A cover 24 is a member for shutting the body 21 from its upper side, and two stirring spatulas 25 and 25 are set up inside the cover 24. The stirring spatula 25 is a member wherein plural legs are formed by cutting a cylinder appropriately. An axis 26 of the stirring spatula 25 is inserted into the cover 24 and projects upwards from the cover 24. A gear 27 is fixed to the top end of the axis 26. The gears 27 and 27 fixed to the axes 26 and 26, respectively, are engaged with each other. One of the gears 27 and 27 is engaged with a gear fitted to a non-illustrated motor.

A non-oxidizing gas supplying opening 28 is made in the cover 24. The middle of a pipe 29 having the gas supplying opening is provided with a heater 30 for heating gas. This gas heating heater 30 heats non-oxidizing gas sent from a non-illustrated non-oxidizing gas supplying source at 100° C. or higher. An air outlet 31 is made in the cover 24. A non-illustrated lid is fitted to the air outlet 31 in the manner that the lid is freely opened or shut.

The following will describe separation of oxide and the solder from dross in the separating device of the present embodiment.

The separating advice is placed near the jet solder tank in the automatic soldering machine in the state that the solder 23 inside the body 21 is melted at a given temperature. If dross is collected in the jet solder tank during soldering work in the automatic soldering machine, the dross is dipped up from the jet solder tank and the cover 24 of the separating device is opened to put the dross into the body 21. The body 21 is then covered with the cover 24, and subsequently a non-oxidizing gas such as nitrogen gas is caused to flow from the gas supplying opening 28 into the body 21 in the state that the cover of the air outlet 31 is opened. The non-oxidizing gas caused to flow from the gas supplying opening 28 into the body 21 forces out air inside the body 21 from the air outlet 31. Thus, the concentration of oxygen is lowered inside the body 21. When the oxygen concentration is sufficiently lowered inside the body 21, the supply of the non-oxidizing gas may be stopped and the lid of the air outlet 31 may be closed. Alternatively, the inflow rate of the supplied non-oxidizing gas may be made less in the state that the lid of the air outlet 31 is opened. Nitrogen gas used at this time is nitrogen heated to 100° C. or higher with the heater 30.

The non-illustrated motor set up in the separating device is driven. By the rotation of this motor, the gear 27 of one of the stirring spatulas 25, the gear 27 being engaged with the gear of the motor, rotates. At the same time, the gear 27 of the other stirring spatula 25, the gear 27 being engaged with the above-mentioned gear, also rotates together with the motor. As a result, the stirring spatulas 25 and 25 set up inside the body 1 cause the dross 12 and the melted solder 23 to be stirred.

The dross 12 stirred in the non-oxidizing atmosphere at high temperature is separated into oxide and solder. The solder dissolves into the melted solder inside the body 21, and only the oxide remains on the melted solder. This oxide is dipped up and putted in another container. When the oxide is separated from the dross in this manner, the solder increases inside the body 21 of the separating device. Therefore, the melted solder is appropriately bailed out from the body 21 and returned to the jet solder tank in order to be used for soldering.

Figure 1:
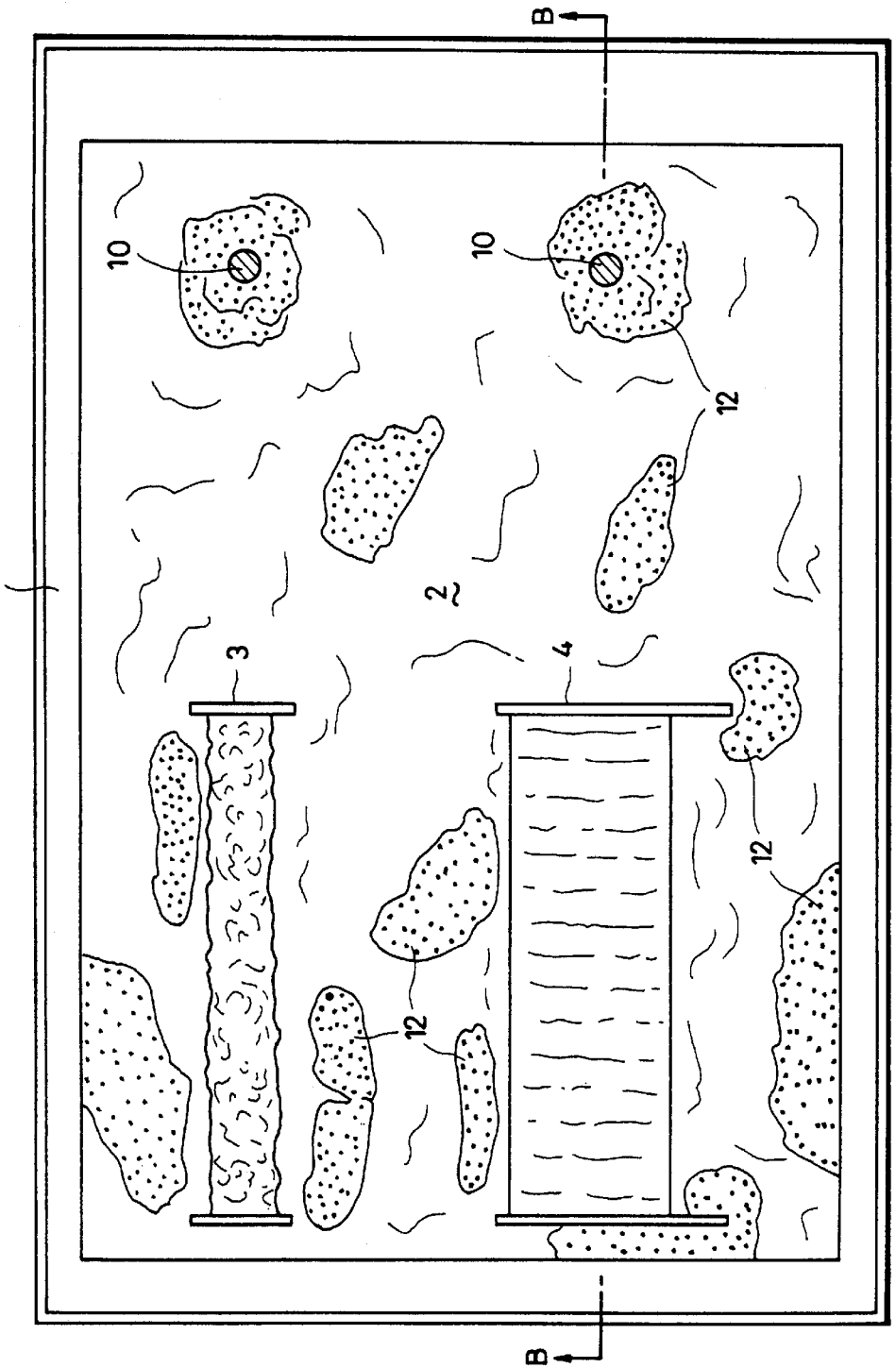
FIG. 1 is a plan view of an example of conventional jet solder tanks.
Figure 2:
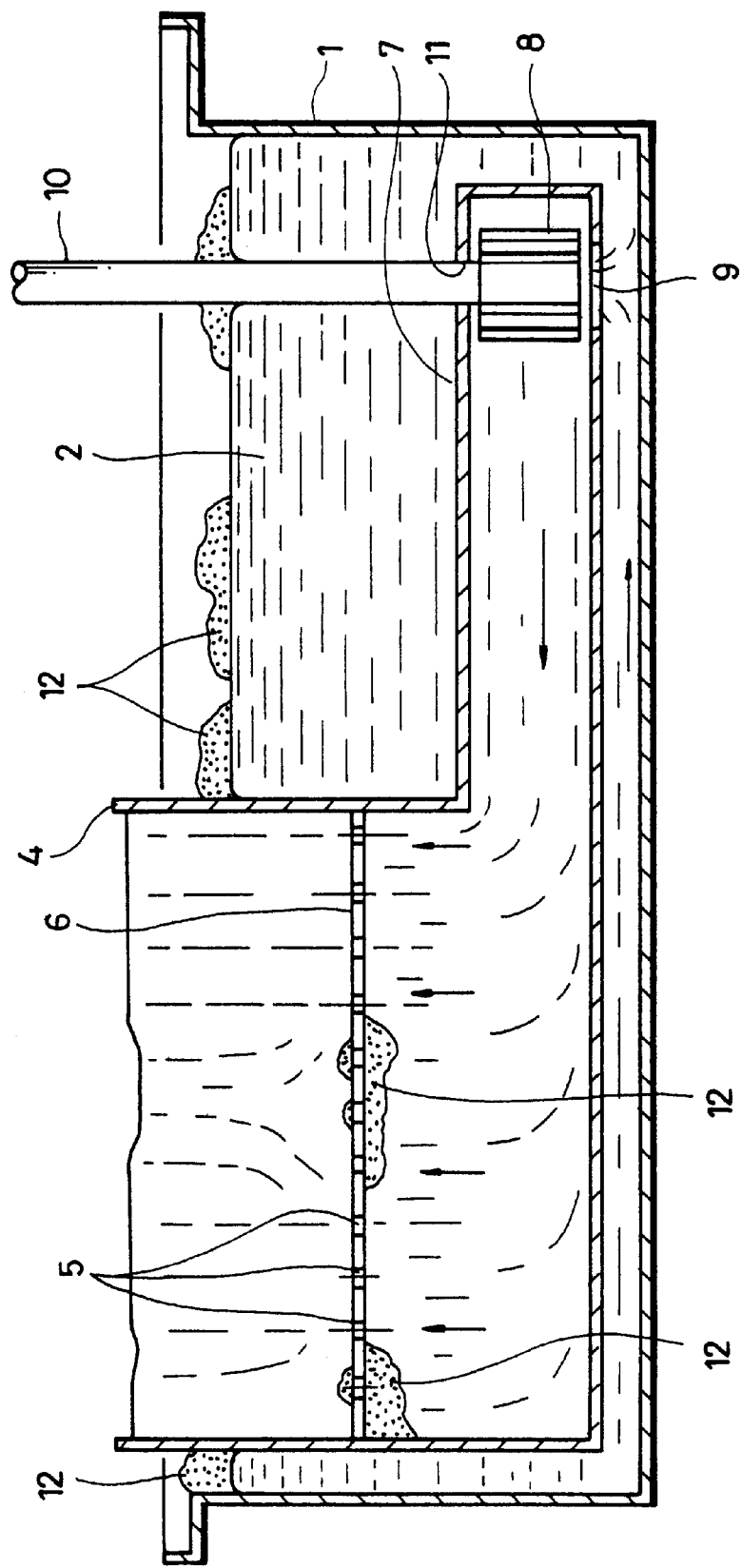
FIG. 2 is a sectional view taken along B—B line of FIG. 1.

The following will describe the jet solder tank of the present embodiment, referring to FIGS. 5 and 6. To the same members in the present jet solder tank as in the conventional jet solder tank shown in FIGS. 1 and 2 are attached the same reference numbers. Explanation thereof is omitted.

At one side of a body 1, a slightly wide dross reservoir 32 is present. Gutters 33 and 33 are located on both sides of the primary jet nozzle 3 and the secondary jet nozzle 4 and along their longitudinal direction. All of the gutters 33 are inclined toward the dross reservoir 32 (the left side in FIG. 6). Therefore, the melted solder jetted out from the nozzle flows toward the dross reservoir along the gutters 33. The outlet portion of each of the gutters 33 is provided with a flow guide plate 34 that is sloped down to a middle point and hang just down from the point. The plate 34 does not reach the bottom of the body 1. This flow guide plate 34 is a member for sending the melted solder flown from the gutter 33 into the dross reservoir 32 without disturbing the flow of the melted solder. When the dross remaining in the dross reservoir 32 sinks at the bottom, the plate 34 also functions as a member for causing the dross not to flow in the lower portion of the duct 7.

A cover 35 is set up over the dross reservoir 32. The cover 35 has a ladle-shaped section. A hole is made in the portion corresponding to its grip. The inside of the cover 35 is provided with plural stirring spatulas 36. An axis 37 of each of the stirring spatulas 36 is inserted into the cover 35 and projects over the cover 35. A gear 38 is fixed to the axis 37 of each of the stirring spatulas 36. A chain 39 is strained on the respective gears 38 with alternations of right and left sides of the gears. The gear 41 of the motor 40 is also chained with the chain 39.

A non-oxidizing gas supplying opening 42 is made in the cover 35. A pipe 43 connected to the gas supplying opening 42 is also connected to a non-illustrated non-oxidizing gas supplying source through a gas heating heater 44.

The following will describe separation of dross in the jet solder tank of the present embodiment.

A jet pump 8 in the jet solder tank is rotated with a non-illustrated motor, so that the melted solder 2 flows from an inhalation opening 9 in a duct 7 into the duct 7 and flows inside the duct 7 as shown in an arrow. The melted solder then flows from the duct 7 into a nozzle 4, and passes through holes 5 in a rectifying plate 6 to be jetted out upwards from the outlet of the nozzle 4. A printed board passing above is brought into contact with the melted solder jetted from the nozzle 4, so that the solder adheres to the printed board.

The melted solder jetted from the nozzle 4 drops on both sides of the nozzle 4. Since on both the sides of the nozzle 4 the gutters 33 and 33 are arranged to be inclined toward the dross reservoir 32, the melted solder that has been jetted from the nozzle 4 and has dropped flows in the dross reservoir 32 through the gutters 33 and 33.

In this case, a new portion of the melted solder jetted from the nozzle 4 always contacts air. Therefore, at the same time when oxide is produced, the solder takes in this oxide to produce dross. The oxide and the dross produced in this manner, together with the melted solder, forcibly flow from the gutters 33 toward dross reservoir 32, and are collected in the dross reservoir 32.

A cover 35 is put on the dross reservoir 32, and a stirring spatula 36 rotates inside the cover 35 to stir the melted solder and the dross. From the dross stirred herein, oxide and melted solder are separated. The melted solder dissolves into the melted solder in the jet solder tank, so that only the oxide remains in the cover 35. A non-oxidizing gas supplying opening 42 is made in the cover 35, and from this supplying opening 42, non-oxidizing gas heated with the gas heating heater is supplied. Therefore, the solder separated from the dross does not take in the oxide. Whenever a given time passes, a worker opens the cover, dips up the oxide floating on the melted solder with a ladle, and throws it away into the container.

In the jet solder tank of the present embodiment, nitrogen gas heated to 150° C. as a non-oxidizing gas was used to solder a printed board, and every 4 hours the cover was opened to dip up the oxide. As a result, no dross to be thrown away was found. On the other hand, in a conventional jet solder tank, a printed board was soldered, and every 2 hours dross was taken out. As a result, about 10 kg of dross was thrown away.

The above-mentioned embodiment is an embodiment wherein nitrogen gas is used as a non-oxidizing gas, but instead of carbon dioxide gas, argon gas, hydrogen gas, ammonia decomposed gas or the like can be used. In the above-mentioned embodiment, the non-oxidizing gas supplying opening 28 is made in the cover 24, but instead of this form, the non-oxidizing gas supplying opening may be made in a given position in the body (container) 21 of the separating device.

Of course, the present invention is not limited to the above-mentioned embodiments, and various modifications can be adopted without departing from the subject matter of the present invention.

As described above, according to the separating method of the present invention, solder that has been thrown away as dross in the prior art is again returned to solder, and can be used. Therefore, the consumption of the solder becomes very small. This produces a large effect on saving of resources. The separating device of the present invention is located near an automatic soldering machine and dross generated in its jet solder tank is merely thrown into the body of the separating device, so that oxide and solder can be separated. Thus, handling of the dross is very easy, and simple. Furthermore, in the jet solder tank of the present invention, dross generated therein can be automatically separated into oxide and solder. Therefore, the work for removing the dross is not unnecessary at all. Moreover, it is possible to solve problems about the dross, that is, inconveniences such as poor soldering based on fluctuation in the height of the jetted solder and adhesion of the dross onto a printed board.

Having described preferred embodiments of the invention with reference to the accompanying drawings, it is to be understood that the invention is not limited to those precise embodiments and that various changes and modifications could be effected therein by one skilled in the art without departing from the spirit or scope of the invention as defined in the appended claims.

What is claimed is:

1. Method for separating oxide from dross, wherein the dross floating on a melted solder in a non-oxidizing atmosphere at 100° C. or higher is mechanically stirred together with the melted solder, thereby separating the solder and the oxide.

2. Method for separating the oxide from the dross according to claim 1, wherein the non-oxidizing atmosphere is an atmosphere which is filled with nitrogen gas, carbon dioxide gas, argon gas, hydrogen gas, or ammonia decomposed gas.

3. A device for separating oxide from dross, wherein a container is provided with a heater, a cover is set over the container to be freely attachable or detachable, a non-oxidizing gas supplying opening is made in the cover or the container, and a stirring spatula for mechanically stirring the surface of a melted solder put into the container is set near the surface of the melted solder.

4. The device for separating the oxide form the dross according to claim 3, wherein the non-oxidizing gas supplying opening is provided with a heater.

5. A jet solder tank comprising a heater for heating a solder and a nozzle for jetting the solder melted by heating, wherein a dross reservoir is covered with a cover, and a stirring spatula for mechanically stirring the surface of the melted solder is set up inside the cover.

6. The jet solder tank according to claim 5, wherein the non-oxidizing gas supplying opening is provided with a heater.

7. A jet solder tank comprising a heater for heating a solder and a nozzle for jetting the solder melted by heating wherein a dross reservoir is covered with a cover, a non-oxidizing gas supplying opening is made in the cover, and a stirring spatula for stirring the surface of the melted solder is set up wherein the nozzle is provided with gutters along the longitudinal direction of the nozzle on both sides thereof, the gutters being inclined toward the side.

8. A jet solder tank comprising a heater for heating a solder and a nozzle for jetting the solder melted by heating, said nozzle provided with gutters along the longitudinal direction of the nozzle on both sides thereof, the gutters being inclined toward the same side, wherein a dross reservoir is covered with a cover, a non-oxidizing gas supply opening is made in the cover, and a stirring spatula for stirring the surface of the melted solder is set up inside the cover.

* * * * *